(12) United States Patent
Nishio

(10) Patent No.: US 12,208,651 B2
(45) Date of Patent: Jan. 28, 2025

(54) METHOD OF MANUFACTURING TIRE, FORMING SYSTEM FOR TIRE, AND TIRE

(71) Applicant: The Yokohama Rubber Co., LTD., Tokyo (JP)

(72) Inventor: Satoru Nishio, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 344 days.

(21) Appl. No.: 17/268,517

(22) PCT Filed: Jun. 14, 2019

(86) PCT No.: PCT/JP2019/023678
§ 371 (c)(1),
(2) Date: Feb. 15, 2021

(87) PCT Pub. No.: WO2020/039714
PCT Pub. Date: Feb. 27, 2020

(65) Prior Publication Data
US 2021/0221174 A1    Jul. 22, 2021

(30) Foreign Application Priority Data
Aug. 21, 2018 (JP) ................. 2018-154418

(51) Int. Cl.
*B29D 30/12* (2006.01)
*B29D 30/16* (2006.01)
(Continued)

(52) U.S. Cl.
CPC ............... *B60C 9/08* (2013.01); *B29D 30/12* (2013.01); *B60C 9/0007* (2013.01); *B65H 69/06* (2013.01);
(Continued)

(58) Field of Classification Search
CPC ........ B29D 30/10; B29D 30/16; B29D 30/30; B65H 7/14; B65H 19/102; B65H 19/20;
(Continued)

(56) References Cited

U.S. PATENT DOCUMENTS 1,315,364 A * 9/1919 Dickinson .............. B29D 30/70
156/117
3,634,972 A * 1/1972 Illman ................... B60C 9/0028
57/22
(Continued)

FOREIGN PATENT DOCUMENTS

AU           3002089 A    8/1989
AU           5894101 A   12/2001
(Continued)

OTHER PUBLICATIONS

Machine translation of JP 2005-153747, 2005.*
(Continued)

*Primary Examiner* — Justin R Fischer
(74) *Attorney, Agent, or Firm* — Thorpe North & Western

(57) ABSTRACT

A method of manufacturing a tire, a forming system for the tire, and the tire are provided. A preceding carcass cord from one feeding unit is used to form a carcass layer while being fed to a forming drum, and a leading edge portion of a next carcass cord is paid out from another feeding unit in advance. At a time when a predetermined length of the preceding carcass cord is fed, a splice mechanism is used to join the leading edge portion of the next carcass cord to the preceding carcass cord to make the leading edge portion of the next carcass cord continuous with the preceding carcass cord. Then, with the next carcass cord fed to the forming drum, formation of the carcass layer is continued to complete the carcass layer.

5 Claims, 19 Drawing Sheets

(51) Int. Cl.
*B60C 9/00* (2006.01)
*B60C 9/08* (2006.01)
*B65H 69/06* (2006.01)
*D07B 1/06* (2006.01)
*B60C 9/04* (2006.01)

(52) U.S. Cl.
CPC .... *D07B 1/0606* (2013.01); *B60C 2009/0035* (2013.01); *B60C 2009/0408* (2013.01); *D07B 2501/2046* (2013.01); *D10B 2331/021* (2013.01)

(58) Field of Classification Search
CPC ........ B65H 19/28; B65H 21/00; B65H 69/06; B60C 2009/0408
See application file for complete search history.

(56) References Cited

U.S. PATENT DOCUMENTS

| | | | |
|---|---|---|---|
| 4,877,073 | A | 10/1989 | Thise et al. |
| 6,422,118 | B1 | 7/2002 | Edwards et al. |
| 2003/0089459 | A1 | 5/2003 | Nauta et al. |
| 2005/0061414 | A1* | 3/2005 | Scarpitti ............. B60C 15/0018 152/550 |
| 2009/0184192 | A1 | 7/2009 | Takatsuka et al. |
| 2009/0301639 | A1* | 12/2009 | Kudo ................. B29D 30/3028 156/397 |

FOREIGN PATENT DOCUMENTS

| | | |
|---|---|---|
| BR | 7901065 A | 10/1979 |
| CA | 1296977 A | 2/1989 |
| CN | 1437529 A | 8/2003 |
| DE | 2807489 A1 | 8/1979 |
| EP | 3782 A1 | 9/1979 |
| EP | 329593 A1 | 8/1989 |
| EP | 1195344 A2 | 4/2002 |
| EP | 1282505 A1 | 2/2003 |
| ES | 2032677 T | 2/1989 |
| GB | 519154 * | 3/1940 |
| JP | 54-122381 A | 9/1979 |
| JP | 61-261028 A | 11/1986 |
| JP | 2-145829 A | 6/1990 |
| JP | 3-193984 A | 8/1991 |
| JP | H06-155628 A | 6/1994 |
| JP | 2000-33805 A | 2/2000 |
| JP | 2003-227082 A | 8/2003 |
| JP | 2003-534158 A | 11/2003 |
| JP | 2005-153747 * | 6/2005 |
| JP | 2005-330630 A | 12/2005 |
| JP | 2007-62585 A | 3/2007 |
| JP | 2012-236195 A | 12/2012 |
| JP | 2014-151627 A | 8/2014 |
| JP | 2016-87792 A | 5/2016 |
| KR | 10-2003-0017975 A | 3/2003 |
| NL | 1015250 C | 11/2001 |
| RU | 2272778 C | 3/2006 |
| SK | 16422002 A | 5/2003 |
| WO | 2001/089813 A1 | 11/2001 |
| WO | 2007/122725 A1 | 11/2007 |

OTHER PUBLICATIONS

Automotive Maintenance and Service Projected Tutorial, published Aug. 2016, p. 120-121, Yankee et al. Eds, China Light Industry Press, China.

Car Chassis Construction and Maintenance Tutorial, published Jun. 2017. p. 126 Prince Ed., Electron and Technology University Press, China.

* cited by examiner

METHOD OF MANUFACTURING TIRE, FORMING SYSTEM FOR TIRE, AND TIRE

TECHNICAL FIELD

The present technology relates to a method of manufacturing a tire, a forming system for a tire, and a tire, and particularly relates to a method of manufacturing a tire, a forming system for the tire, and the tire in which, in manufacture of a tire including a reinforcing member including a reinforcing cord continuously wound a plurality of times in a tire circumferential direction or wound in the tire circumferential direction while continuously extending in a tire width direction, a possible decrease in productivity can be avoided by using the reinforcing cords without waste.

BACKGROUND ART

A method is available in which, in manufacture of a pneumatic tire, tire components are sequentially layered on an outer surface of a rigid core having an outer surface shape corresponding to a tire inner surface shape of a completed tire to form a green tire. A proposal has been made in which this forming method includes a forming step in which, on an outer surface of a rubber member disposed on the outer surface of the rigid core, one reinforcing cord is extended in the width direction of the rigid core and continuously placed in the circumferential direction of the rigid core (see Japan Unexamined Patent Publication No. H06-155628).

In such a forming method, the forming step stops when a fed reinforcing cord becomes insufficient in length during the step. In addition, since a member formed by the reinforcing cord is incomplete, the green tire being formed may be wasted. Thus, the length of the one reinforcing cord needs to be set to avoid becoming insufficient during the formation of the green tire. However, a reinforcing cord with a required length cannot always be prepared. For example, even in a case where a reinforcing cord with a sufficient length is initially prepared, the reinforcing cord may shorten by being used to form a plurality of green tires, with the remaining length being insufficient to form one green tire. In this case, since the remaining reinforcing cord fails to be used to form the green tire, there is room for improvement in using the reinforcing cord without waste.

SUMMARY

The present technology provides a method of manufacturing a tire, a forming system for the tire, and the tire in which, in manufacture of a tire including a reinforcing member including a reinforcing cord continuously wound a plurality of times in the tire circumferential direction or wound in the tire circumferential direction while continuously extending in the tire width direction, a possible decrease in productivity can be avoided by using the reinforcing cords without waste.

A method for manufacturing a pneumatic tire according to an embodiment of the present technology is a method for manufacturing a tire including a reinforcing member including a reinforcing cord continuously wound a plurality of times in a tire circumferential direction or wound in the tire circumferential direction while continuously extending in a tire width direction, the method including preparing a plurality of feeding units feeding the reinforcing cords, feeding, in advance as a preceding reinforcing cord, the reinforcing cord stocked in one of the feeding units and using the preceding reinforcing cord to form the reinforcing member, using, as a next reinforcing cord, the reinforcing cord stocked in another of the feeding units and paying out a leading edge portion of the next reinforcing cord, at a time when a predetermined length of the preceding reinforcing cord is fed, joining the leading edge portion to the preceding reinforcing cord using a splice mechanism to make the leading edge portion continuous with the preceding reinforcing cord, then continuing formation of the reinforcing cord while feeding the next reinforcing cord to complete the reinforcing cord, and vulcanizing a green tire with the reinforcing member completed.

A forming system for a pneumatic tire according to an embodiment of the present technology is a forming system including a forming drum around which a reinforcing cord is continuously wound a plurality of times in a circumferential direction or wound in the circumferential direction while continuously extending in a width direction, a feeding unit in which the reinforcing cord is stocked and paid out and fed toward the forming drum, and an arrangement unit disposing the reinforcing cord on an outer surface of the forming drum, the forming system including a plurality of the feeding units, the reinforcing cord stocked in one of the feeding units being fed in advance toward the forming drum as a preceding reinforcing cord and used to form a reinforcing member, the reinforcing cord stocked in another of the feeding units being fed toward the forming drum as a next reinforcing cord after the preceding reinforcing cord and used to form the reinforcing member, the forming system including a trailing edge portion holding machine holding a trailing edge portion of the preceding reinforcing cord, a leading edge portion holding machine holding a leading edge portion of the next reinforcing cord in advance, a splice mechanism joining the trailing edge portion to the leading edge portion to make the trailing edge portion continuous with the leading edge portion, and a control unit causing the leading edge portion to be placed on the splice mechanism and causing the trailing edge portion of the preceding reinforcing cord fed by a predetermined length to be held by the trailing edge portion holding machine and placed on the splice mechanism.

A tire according to an embodiment of the present technology includes a reinforcing member including a reinforcing cord continuously wound a plurality of times in a tire circumferential direction or wound in the tire circumferential direction while continuously extending in a tire width direction, the reinforcing member being formed by joining longitudinal end portions of a plurality of the reinforcing cords, a joint portion at which the plurality of the reinforcing cords are joined being disposed within an inner circumferential side range or an outer circumferential side range of a belt layer constituting the tire or within a setting range of a bead core portion constituting the tire.

According to the method of manufacturing a tire and the forming system for the tire according to an embodiment of the present technology, the preceding reinforcing cord fed in advance in order to form a desired reinforcing member is joined to the next reinforcing cord fed next and made continuous with the next reinforcing cord, thus continuing formation of the reinforcing member. Thus, even in a case where each of the reinforcing cords fed is not sufficient in length, the reinforcing cord can be used to form the reinforcing member without waste. In addition, after the preceding reinforcing cord is fed by a predetermined length, the leading edge portion of the next reinforcing cord paid out in advance is joined to the preceding reinforcing cord using the splice mechanism and made continuous with the preceding reinforcing cord, thus reducing the time during which steps are disrupted. Thus, a reduction in the productivity of the tire can be avoided.

According to the tire according to an embodiment of the present technology, the joint portion at which the longitudinal end portions of the reinforcing cords are joined is disposed within the inner circumferential side range or the outer circumferential side range of the belt layer, or within the setting range of the bead core portion. The joint portion is likely to be more rigid than a non-joint portion, the above-described range in which the joint portion is disposed corresponds to a range with a relatively high rigidity in the tire. This allows suppression of the effect, on tire performance, of a difference in rigidity between the joint portion and the non-joint portion.

DETAILED DESCRIPTION

A method of manufacturing a tire, a forming system for a tire, and a tire according to an embodiment of the present technology will be described below with reference to the figures.

The method of manufacturing a tire and the forming system for the tire according to an embodiment of the present technology are used in manufacturing a tire including a reinforcing member including a reinforcing cord continuously wound a plurality of times in the tire circumferential direction or a reinforcing member including a reinforcing cord wound in the tire circumferential direction while continuously extending in the tire width direction. In other words, a tire T according to an embodiment of the present technology illustrated in FIGS. 1 to 3 or FIG. 4 can be manufactured by using the tire manufacturing method or forming system according to the embodiment of the present technology described below.

Figure 1:
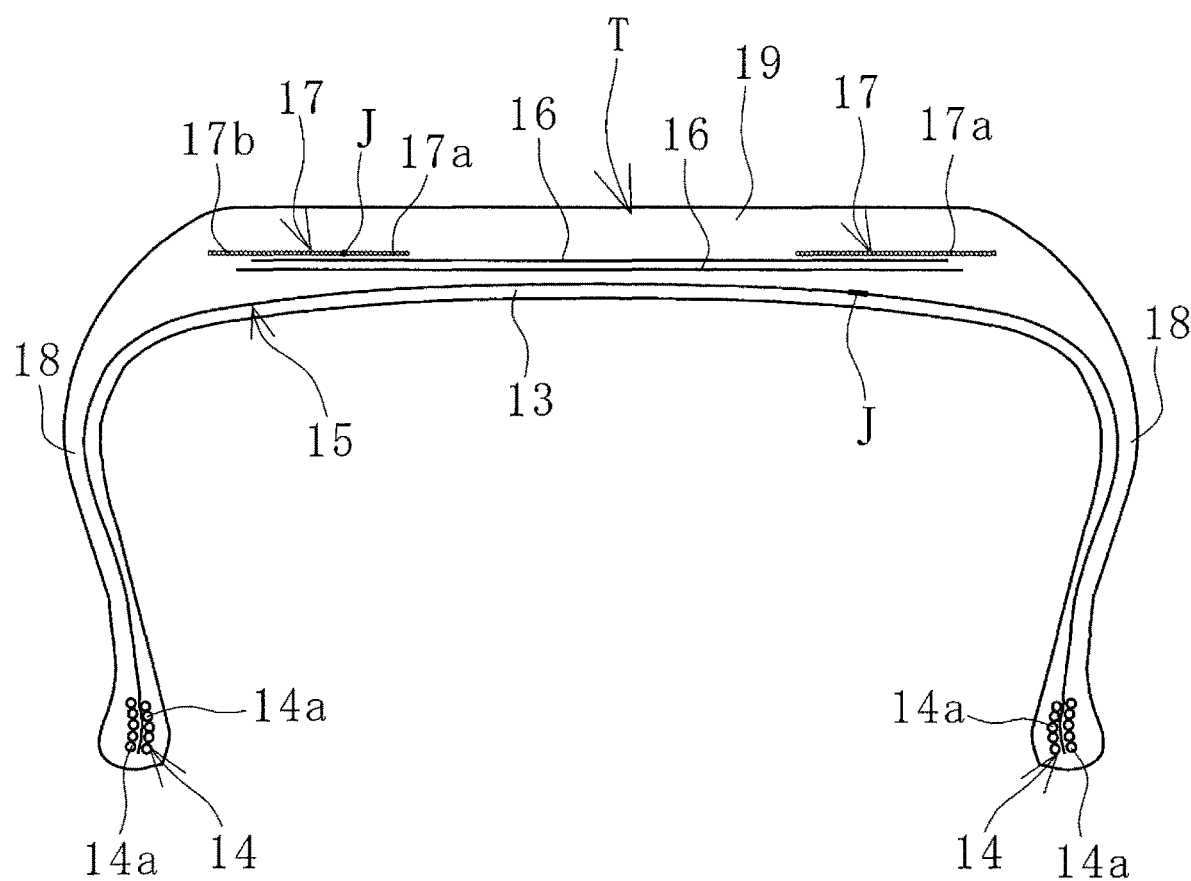
FIG. 1 is an explanatory diagram illustrating a part of a tire in a cross-sectional view.
Figure 2:
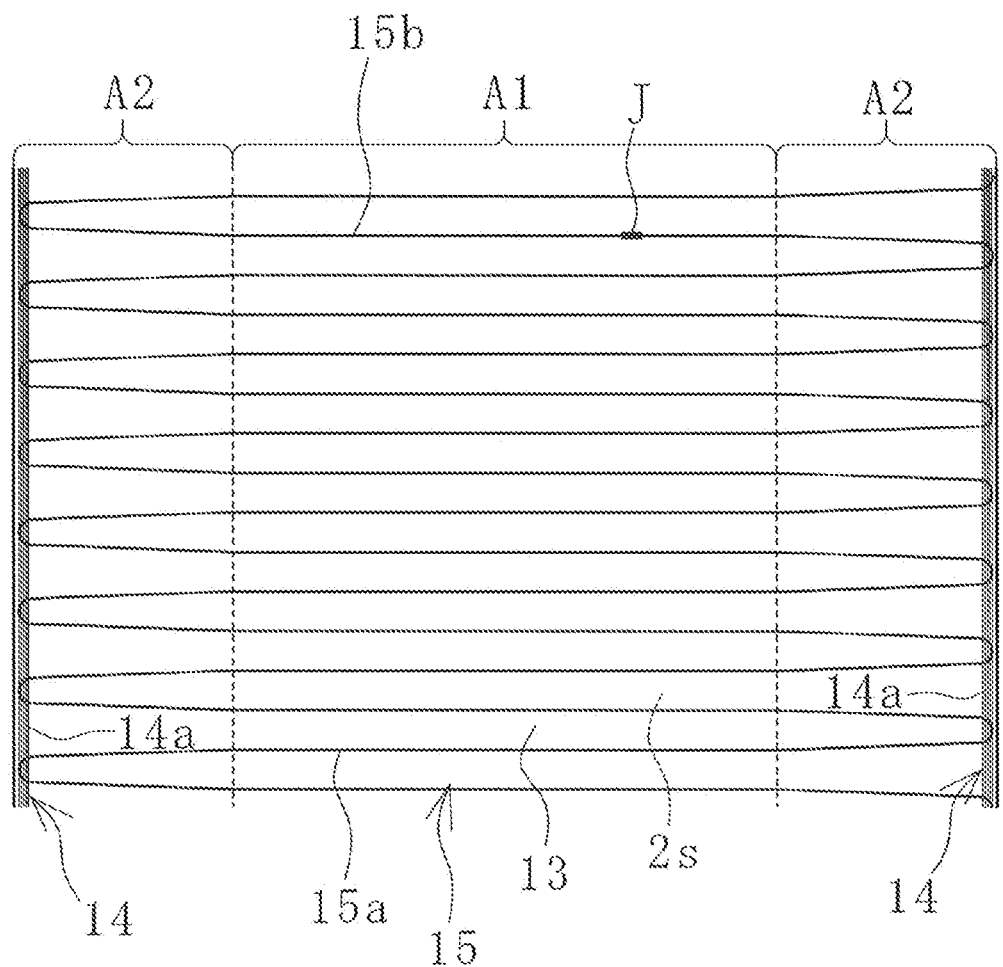
FIG. 2 is an explanatory diagram illustrating a carcass layer in FIG. 1 with the tire cut through from the front and extended.
Figure 3:
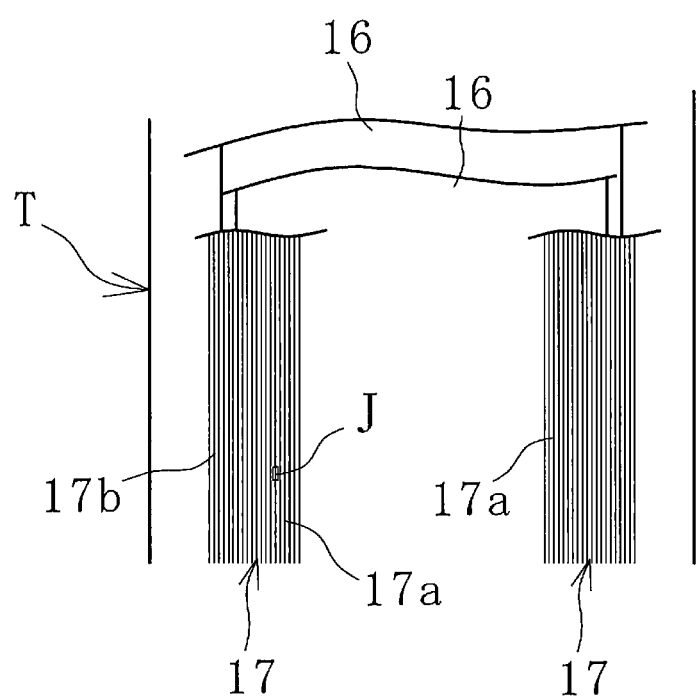
FIG. 3 is an explanatory diagram illustrating a belt layer and a belt cover layer in a front view.

The embodiment of the tire T illustrated in FIGS. 1 to 3 includes a reinforcing member (belt cover layer 17) including cover cords 17a and 17b are corresponding to reinforcing cords and continuously wound a plurality of times in the tire circumferential direction. The cover cords 17a and 17b have the same specifications, and are joined at longitudinal end portions and made continuous with each other. The cover cords 17a and 17b have known specifications, and are made of steel cords or organic fiber cords such as nylon and aramid.

Furthermore, the tire T includes a reinforcing member (carcass layer 15) including carcass cords 15a and 15b corresponding to reinforcing cords and wound in the tire circumferential direction while continuously extending in the tire width direction. The carcass cords 15a and 15b have the same specifications, and are joined at longitudinal end portions and made continuous with each other. The carcass cords 15a and 15b have the same specifications and are preferably made of organic fiber cords such as nylon and aramid.

The tire T includes the belt cover layer 17 and the carcass layer 15 according to the specifications described above formed by the reinforcing cords, but no such limitation is intended for the tire T of the present technology. It is sufficient that the tire T according to an embodiment of the present technology includes at least one of the reinforcing member including the reinforcing cord continuously wound a plurality of times in the tire circumferential direction in a continuous state, or the reinforcing member wound in the tire circumferential direction while continuously extending in the tire width direction.

The tire T includes bead core portions 14 having an annular shape at respective end portions in the width direction. Each of the bead core portions 14 is formed by winding a bead wire (steel cord) 14a a plurality of times in the tire circumferential direction. Note that the reinforcing cords for which the position of a joint portion J described below is identified by the present technology does not include the bead wires 14a but excludes the bead wires 14a.

The carcass layer 15 is mounted between the bead core portions 14. The carcass layer 15 is layered on the outer circumferential side of an innerliner 13. A plurality of belt layers 16 are layered on the outer circumferential side of the carcass layer 15. Each of the belt layers 16 is formed from steel cords having a larger diameter than the cover cords 17a and 17b. A belt cover layer 9 is layered on the outer circumferential side of the belt layers 16. In this embodiment, the two belt cover layers 17 are disposed at an interval in the tire width direction at positions where the belt cover layers 17 cover respective tire width direction end portions of the belt layers 16.

A tread portion 19 including a rubber member is layered on the outer circumferential side of the belt layers 16 and the belt cover layers 17. A side portion 18 including a rubber member is layered on both tire width direction outer sides of the carcass layer 15. The tire T includes other tire components as necessary.

In the tire T, the joint portion J at which the cover cords 17a and 17b are joined and the joint portion J at which the carcass cords 15a and 15b are joined are disposed within a tire width direction setting range of the belt layers 16. It is sufficient that the joint portions J are disposed within the tire width direction setting range of at least one of the belt layers 16. In other words, in the tire width direction, the joint portions J are present within the range in which at least one of the belt layers 16 is present.

Figure 4:
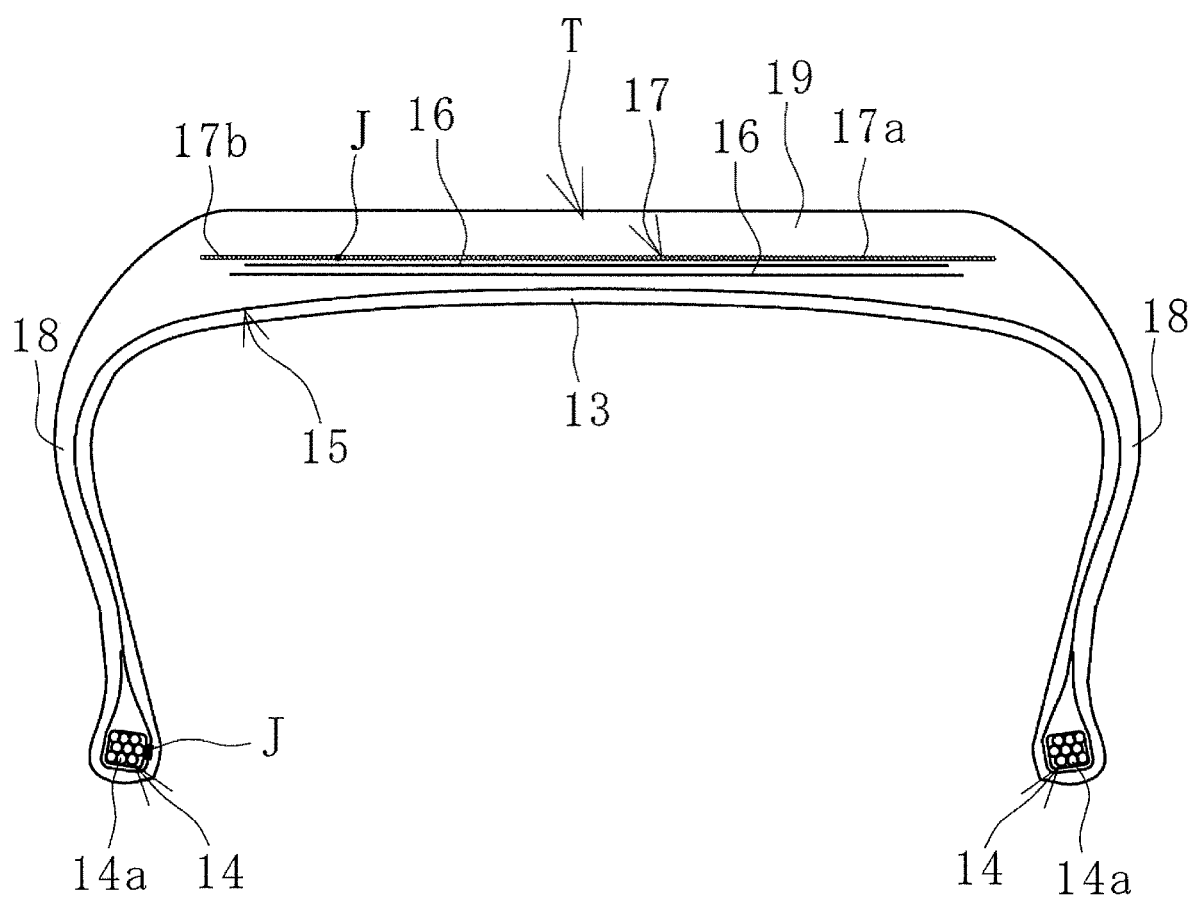
FIG. 4 is an explanatory diagram illustrating a part of another tire according to an embodiment of the present technology in a cross-sectional view.

In another embodiment of the tire T illustrated in FIG. 4, unlike in the above-described embodiment, the bead core portion 14 with a common configuration is used that is formed into a bundle in advance by winding the bead wires 14a a plurality of times. Additionally, one belt cover layer 17 is disposed without separation in the tire width direction.

In the tire T, the joint portion J at which the cover cords 17a and 17b are joined are disposed within the tire width direction setting range of the belt layer 16. The joint portion J at which the carcass cords 15a and 15b are joined are disposed on the outer circumferential surface of one of the bead core portions 14. The joint portion J between the carcass cords 15a and 15b may be disposed on the outer circumferential surface of at least one of the bead core portions 14.

In the carcass cords 15a and 15b and the cover cords 17a and 17b, the joint portions J tend to be more rigid than the non-joint portions. Due to the difference in rigidity between the joint portion J and the non-joint portion, tire performance may be affected. Thus, as described above, the joint portion J is disposed within the tire width direction setting range of the belt layer 17 or the setting range of the bead core portion 14 (inside or on the outer circumferential surface).

These ranges in which the joint portions J are disposed are relatively rigid ranges in the tire T. Moreover, the bead core portion 14 and the belt layer 16 are members that are more rigid than the carcass layer 15 and the belt cover layer 17. Thus, for the rigidity of the overall tire T, the difference in rigidity between the joint portion J and the non-joint portion is negligible. Accordingly, the present embodiment is very advantageous in suppress the adverse effect, on tire performance, of the difference in rigidity between the joint portion J and the non-joint portion.

Figure 5:
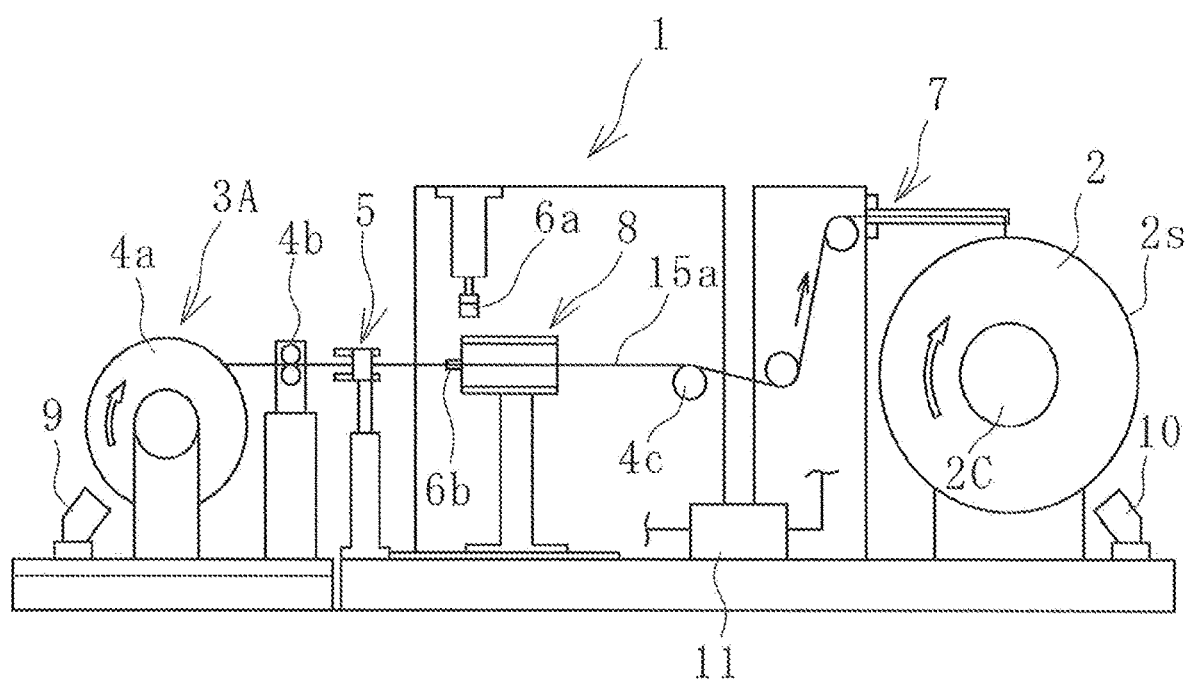
FIG. 5 is an explanatory diagram illustrating an embodiment of a forming system for a tire of the present technology in a side view.
Figure 6:
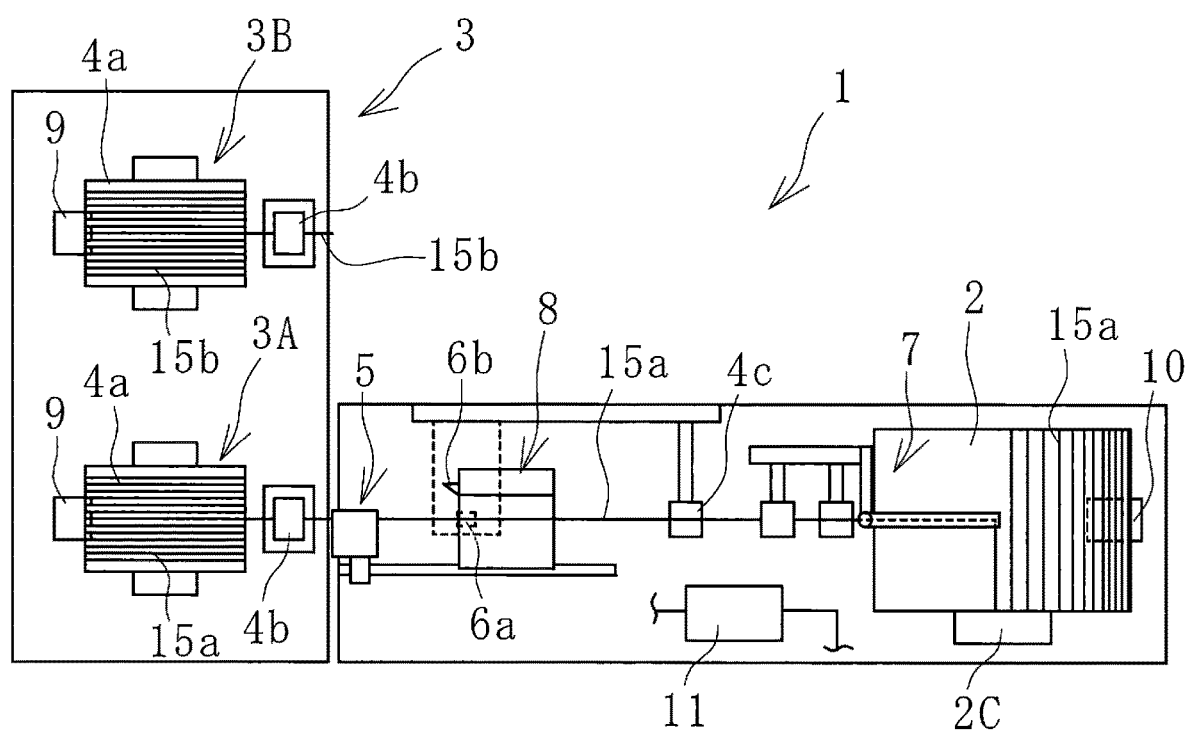
FIG. 6 is an explanatory diagram illustrating the forming system in FIG. 5 in a plan view.

An embodiment of the forming system 1 for the pneumatic tire of the present technology illustrated in FIGS. 5 and 6 includes the forming drum 2, a feeding unit 3 (3A and 3B) feeding the carcass cords 15a and 15b toward the forming drum 2, an arrangement unit 7 disposing the carcass cords 15a and 15b on an outer surface of the forming drum 2, and a splice mechanism 8 joining the carcass cords 15a and 15b together to make the carcass cords 15a and 15b continuous with each other. Various known mechanisms for the splice mechanism 8 can be used. The feeding unit 3, the splice mechanism 8, the arrangement unit 7, and the forming drum 2 are disposed in this order from a downstream side to an upstream side in the feeding direction of the carcass cords 15a and 15b.

A plurality of support rollers 4c supporting the carcass cords 15a and 15b are disposed in series between the splice mechanism 8 and the forming drum 2. In this embodiment, the support roller 4c disposed immediately downstream of the splice mechanism 8 is configured to move vertically.

In this embodiment, two feeding units 3A and 3B are mounted on a base and the base slides in the center shaft direction of a holding reel. The sliding of the base allows movement of any one of the feeding units 3A and 3B to a feeding position that is in series with the splice mechanism 8. Three or more feeding units 3 can be provided and any of the feeding units 3 can move to the feeding position.

The feeding unit 3 includes holding reels 4a in which the carcass cords 15a and 15b are stocked, and leading edge portion holding machines 4b holding the leading edge portions of the carcass cords 15a and 15b paid out from the holding reels 4a. The carcass cords 15a and 15b are stocked by being wound around the holding reels 4a.

The arrangement unit 7 includes, for example, an arm that moves, above an outer surface 2s of the forming drum 2, the carcass cords 15a and 15b fed from the feeding unit 3, while holding the carcass cords 15a and 15b. Motion of the arm and rotation of the forming drum 2 around a center shaft 2C allows the carcass cords 15a and 15b to be disposed at a desired position on the outer surface of the forming drum 2.

Furthermore, the forming system 1 includes a conveying mechanism 5 conveying leading edge portions of the carcass cords 15a and 15b to the splice mechanism 8, a cutting machine 6b cutting the carcass cords 15a and 15b, a trailing edge portion holding machine 6a holding trailing edge portions of the carcass cords 15a and 15b, remaining amount sensors 9, a progress sensor 10, and a control unit 11. Movement of the equipment constituting the forming system 1 is controlled by the control unit 11.

Figure 13:
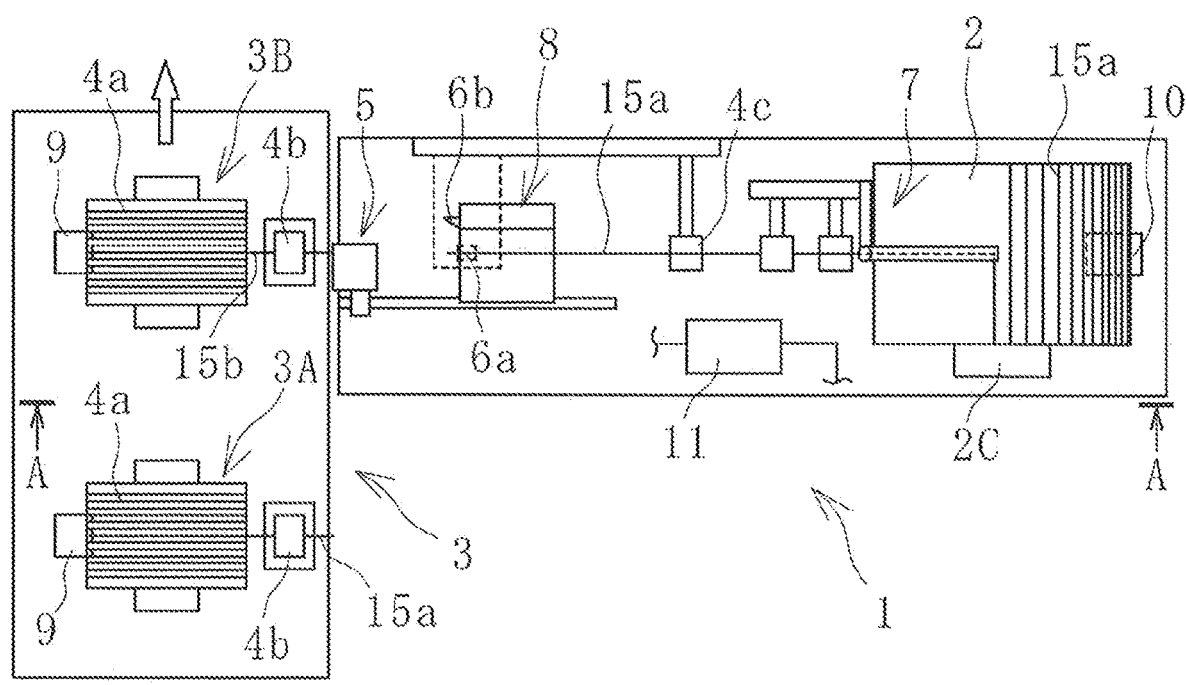
FIG. 13 is an explanatory diagram illustrating, in a plan view, a step of moving a feeding unit in which a next carcass cord is stocked to a feeding position.

The conveying mechanism 5 moves between the feeding unit 3 and the splice mechanism 8. The cutting machine 6b is attached to an upstream end of the splice mechanism 8. The trailing edge portion holding machine 6a is provided at a position above an upstream end portion of the splice mechanism 8 and is movable up and down. The trailing edge portion holding machine 6a and the cutting machine 6b may each be disposed at a different position. In FIGS. 6 and 13, a part of the trailing edge portion holding machine 6a is illustrated by a dashed line.

The remaining amount sensors 9 sequentially detect the remaining amounts of the carcass cords 15a and 15b held on the holding reels 4a. The progress sensor 10 detects the progress of formation of the carcass layer 15 on the outer surface of the forming drum 2. Specifically, the progress sensor 10 detects how much of the carcass layer 15 has been formed in the drum circumferential direction (tire circumferential direction) and the drum width direction (tire width direction). A camera device capable of acquiring digital images is used as each of the remaining amount sensors 9 and the progress sensor 10. Detection data from the remaining amount sensors 9 and the progress sensor 10 is sequentially input to the control unit 11.

In a case where the belt cover layer 17 is formed using the forming system 1, the feeding unit 3 uses the holding reels 4a in which the cover cords 17a and 17b are stocked in place of the carcass cords 15a and 15b described above. Then, the cover cords 17a and 17 are fed from the feeding unit 3 toward the forming drum 2 as is the case with the carcass cords 15a and 15b described above.

The tire components are sequentially layered on the outer surface 2s of the forming drum 2. In the present embodiment, a rigid core is used as the forming drum 2. The rigid core 2 is a tubular body having an outer surface corresponding to the inner surface of the completed tire T.

Figure 7:
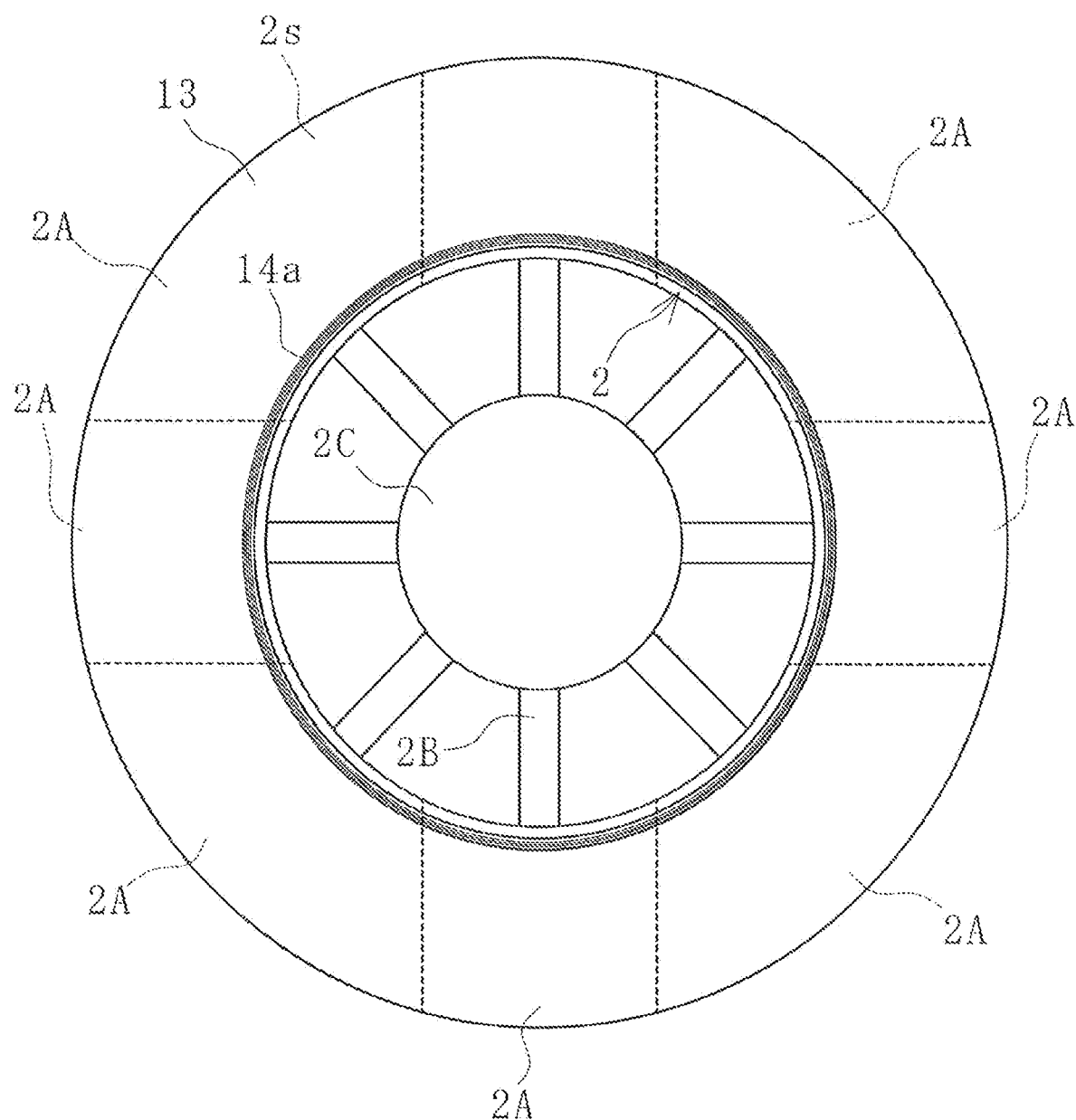
FIG. 7 is an explanatory diagram illustrating a forming drum in FIG. 5 in a side view.
Figure 8:
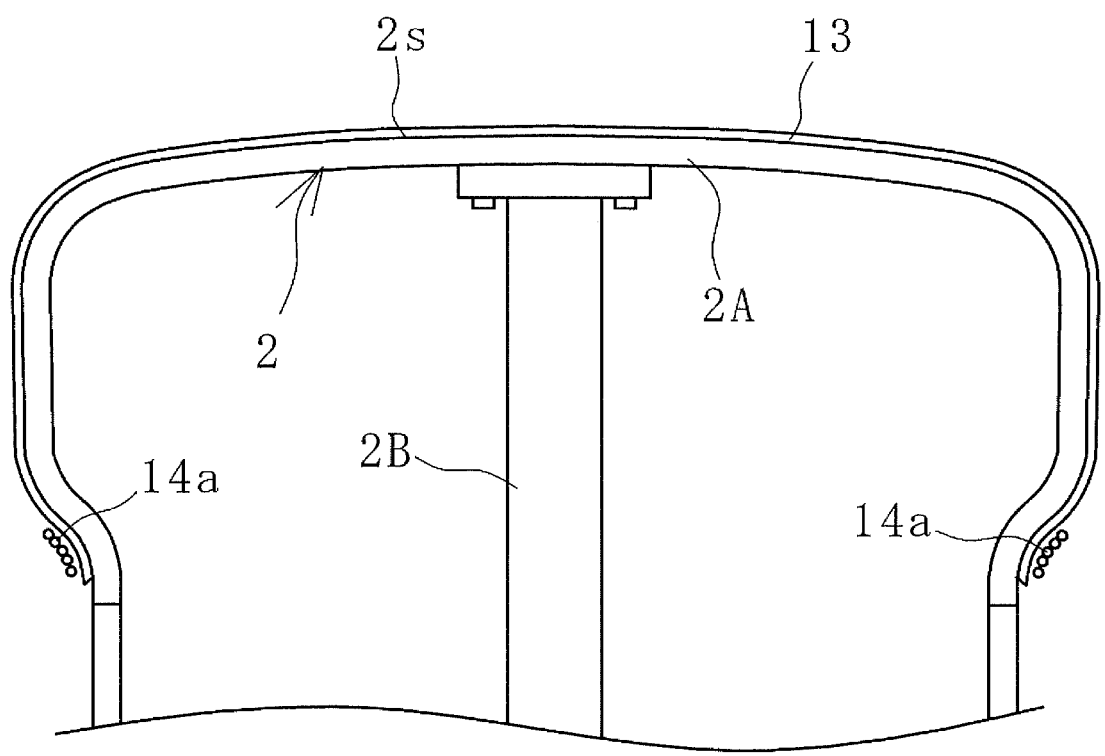
FIG. 8 is an explanatory diagram illustrating the forming drum in FIG. 7 in a cross-sectional view.

As illustrated in FIGS. 7 and 8, the rigid core 2 is configured by assembling a plurality of metal segments 2A separated from one another in the circumferential direction, for example. In the present embodiment, the rigid core 2 is configured by alternately combining, in the circumferential direction, segments 2A with a relatively large circumferential length and segments 2A with a relatively small circumferential length. An inner circumferential surface of each of the segments 2A and a center shaft 2C are coupled by a support arm 2B in a disassemblable manner. The rigid core 2 is disassembled by sequentially moving the relatively short segments 2A inward in the radial direction and then sequentially moving the relatively long segments 2A inward in the radial direction. The present technology is not limited to the rigid core 2, and can use various forming drums 2 on which the tire components are sequentially layered in a case where a green tire G is formed.

An example of a procedure of a method of manufacturing a tire according to an embodiment of the present technology will be described below.

In the forming steps using the forming system 1, the tire components are sequentially layered on the outer surface 2s of the forming drum 2. First, as illustrated in FIGS. 7 and 8, the innerliner 13 is wound on the outer surface 2s of the forming drum 2 in an existing manner. The bead wires 14a are annularly compression-bonded to the innermost circumferential portions of the respective side surfaces of an outer surface of the wound innerliner 13.

Figure 9:
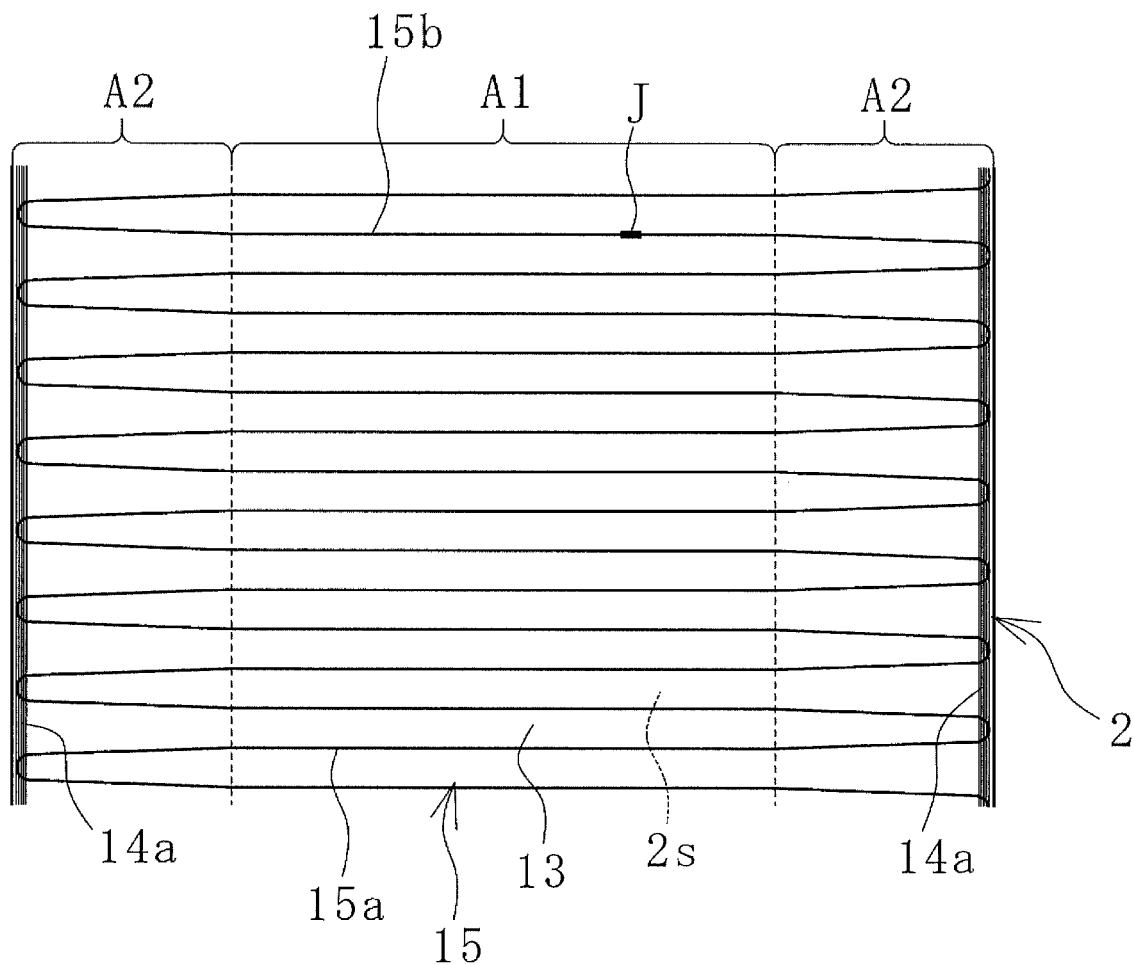
FIG. 9 is an explanatory diagram illustrating a carcass layer layered on an outer surface of the forming drum in FIG. 8 with the forming drum cut through the front and extended.
Figure 10:
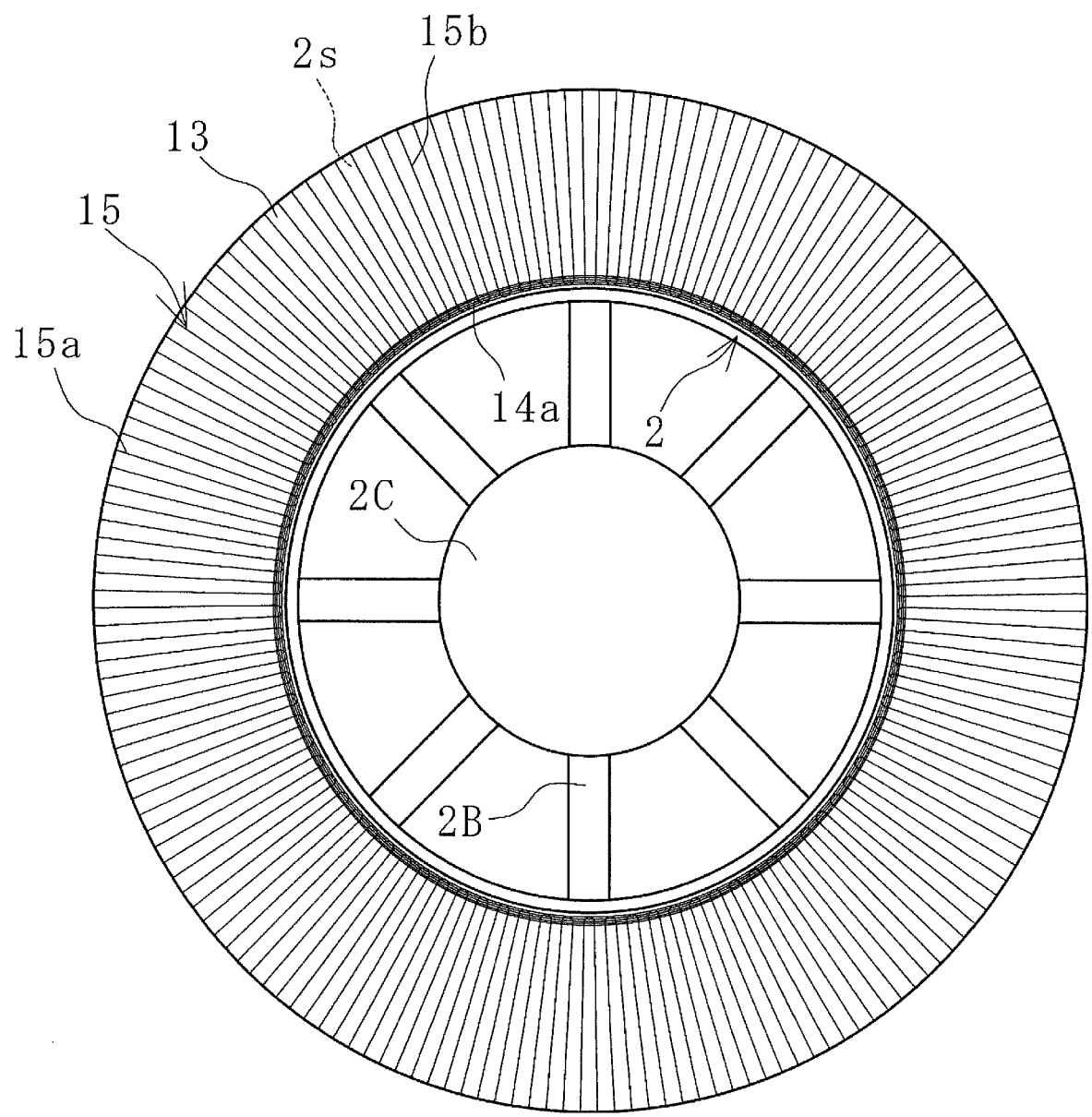
FIG. 10 is an explanatory diagram illustrating the carcass layer in FIG. 9 in a side view of the forming drum.

Then, the carcass layer 15 illustrated in FIGS. 9 and 10 is formed on the outer surfaces of the innerliner 13 and the bead wires 14a. At this time, for example, with the forming drum 2 rotated around the center shaft 2C, the carcass cord 15a, 15b fed from the feeding unit 3 is compression-bonded to the outer surfaces of the innerliner 13 and the bead wires 14a while being extended leftward and rightward in the width direction of the forming drum 2 by the arrangement unit 7.

As illustrated in FIGS. 9 and 10, the operation of the arrangement unit 7 allows continuous arrangement, in the drum circumferential direction, of the one carcass cord 15a (15b) extended on an outer circumferential surface A1 (the range corresponding to the tread portion 19) and both side surfaces A2 (the ranges corresponding to the side portions 18) of the forming drum 2 in the width direction of the forming drum 2. This forms the carcass layer 15 including the one carcass cord 15a, 15b wound in the tire circumferential direction while continuously extending in the tire width direction.

A procedure is as described below in which, during formation of the carcass layer 15, the trailing edge portion of the preceding carcass cord 15a is joined to the leading edge portion of the next carcass cord 15b to make the carcass cords 15a and 15b continuous with each other.

As illustrated in FIGS. 5 and 6, the preceding carcass cord 15a is fed from one of the feeding units, the feeding unit 3A, toward the forming drum 2 to start forming the carcass layer 15. In the present embodiment, the carcass cord 15a paid out from the holding reel 4a is continuously fed to the arrangement unit 7 through the leading edge portion holding machine 4b and the splice mechanism 8. The conveying mechanism 5, the trailing edge portion holding machine 6a, and the cutting machine 6b wait at standby positions. At this time, in the other feeding unit 3B, the next carcass cord 15b is paid out from the holding reel 4a, and the leading edge portion of the next carcass cord 15b is held by the leading edge portion holding machine 4b.

During the formation of the carcass layer 15, the remaining amount of the carcass cord 15a stocked in the holding reel 4a is detected by the remaining amount sensor 9. Then, once a predetermined length of the carcass cord 15a has been fed from the holding reel 4a leading to only a small amount of carcass cord 15a remaining, the feeding of the carcass cord 15a and the rotation of the forming drum 2 are stopped. In a case where a festoon mechanism or the like can be disposed between the splice mechanism 8 and the forming drum 2 to ensure a sufficient excess length of the carcass cords 15a, the formation of the carcass layer 15 can be continued without stopping the rotation of the forming drum 2.

Figure 11:
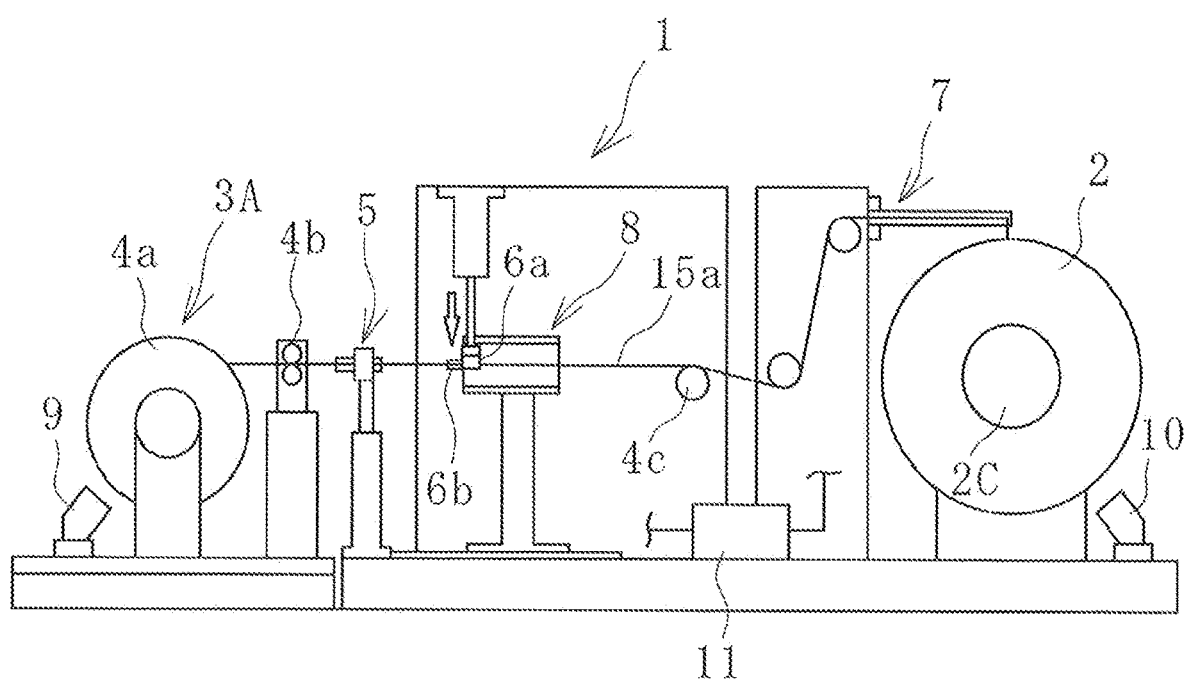
FIG. 11 is an explanatory diagram illustrating a step of cutting a preceding carcass cord fed to the forming drum in FIG. 5.

Then, as illustrated in FIG. 11, the trailing edge portion holding machine 6a is moved downward to hold the carcass cord 15a being fed to the forming drum 2. In this state, the carcass cord 15a is cut by the cutting machine 6b at a position upstream of the position held by the trailing edge portion holding machine 6a. Thus, the trailing edge portion holding machine 6a holds the trailing edge portion of the cut carcass cord 15a.

Figure 12:
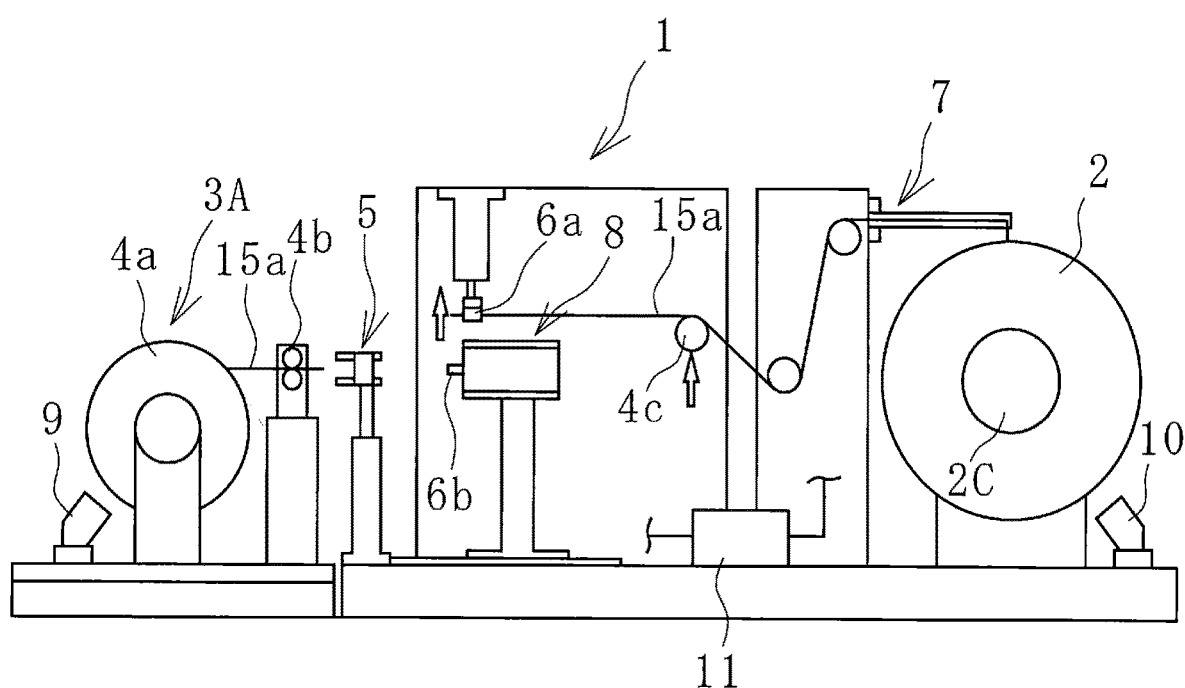
FIG. 12 is an explanatory diagram illustrating a step of holding, by a trailing edge portion holding machine, a trailing edge portion of the cut preceding carcass cord in FIG. 11.

Then, as illustrated in FIG. 12, the trailing edge portion holding machine 6a and the holding roller 4c are moved upward. Thus, the preceding carcass cord 15a is retracted to above the splice mechanism 8. In a case where the trailing edge portion holding machine 6a does not interfere with the conveying mechanism 5 while the conveying mechanism 5 is moving toward the splice mechanism 8, the trailing edge portion holding machine 6a holding the trailing edge portion of the preceding carcass cord 15a need not be moved upward and retracted, and the trailing edge portion may remain disposed in the splice mechanism 8.

Figure 14:
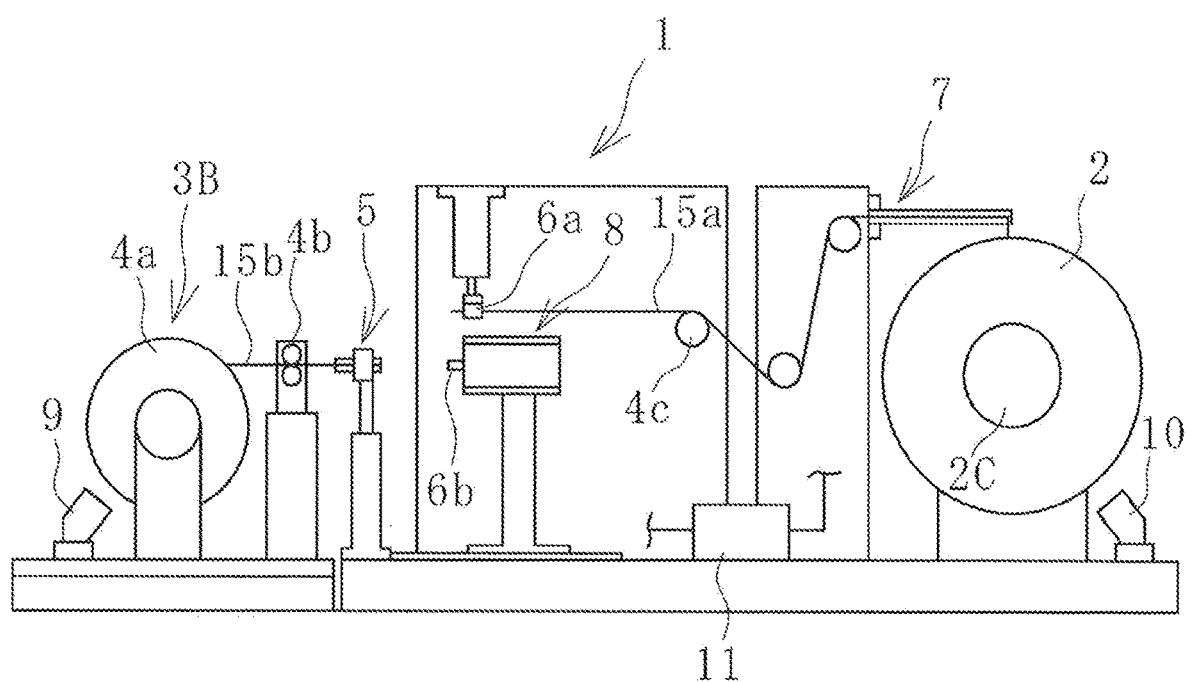
FIG. 14 is an explanatory diagram taken along line A-A indicated by arrows in FIG. 13 and illustrating, in a side view, a step of holding a leading edge portion of the next carcass cord by a conveying mechanism.

Then, as illustrated in FIG. 13, the feeding units 3A and 3B are slid to place the other feeding unit 3B at the feeding position where the feeding unit 3B is in series with the splice mechanism 8. In this state, as illustrated in FIG. 14, the previously paid-out leading edge portion of the next carcass cord 15b is held by the conveying mechanism 5.

Figure 15:
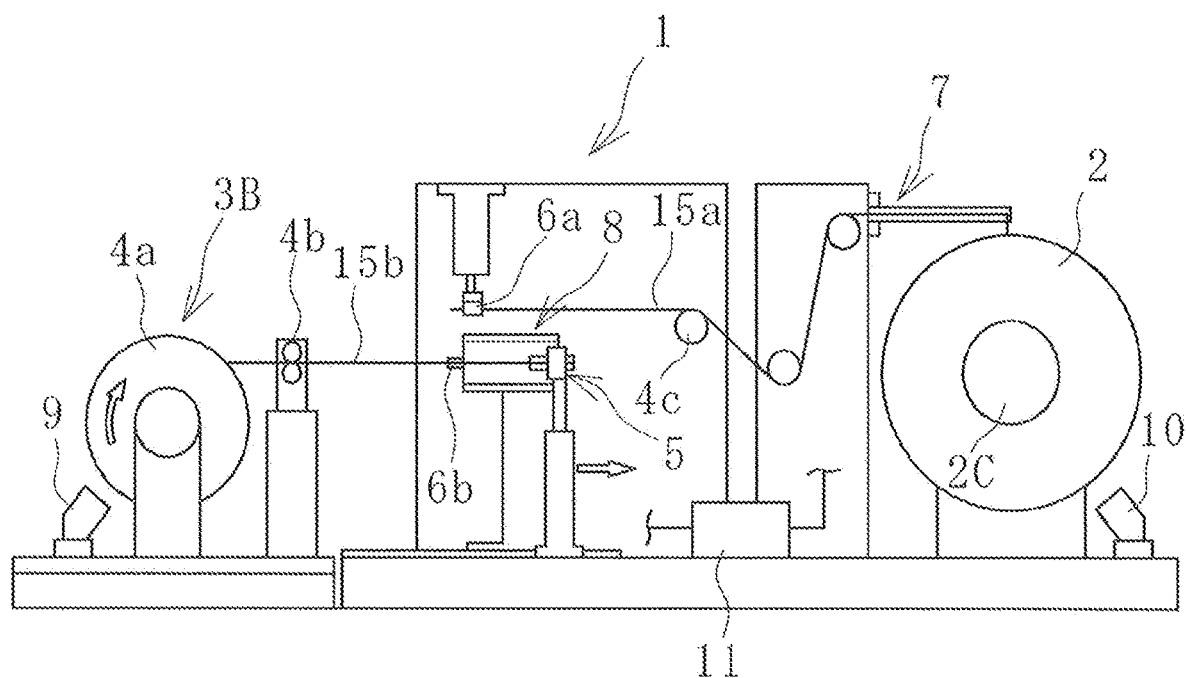
FIG. 15 is an explanatory diagram illustrating a step of moving the conveying mechanism in FIG. 14 toward a splice mechanism.

Then, as illustrated in FIG. 15, the conveying mechanism 5 is moved from the standby position toward the splice mechanism 8. Thus, the next carcass cord 15b is inserted into the splice mechanism 8, and the leading edge portion of the carcass cord 15b is placed in the splice mechanism 8.

Figure 16:
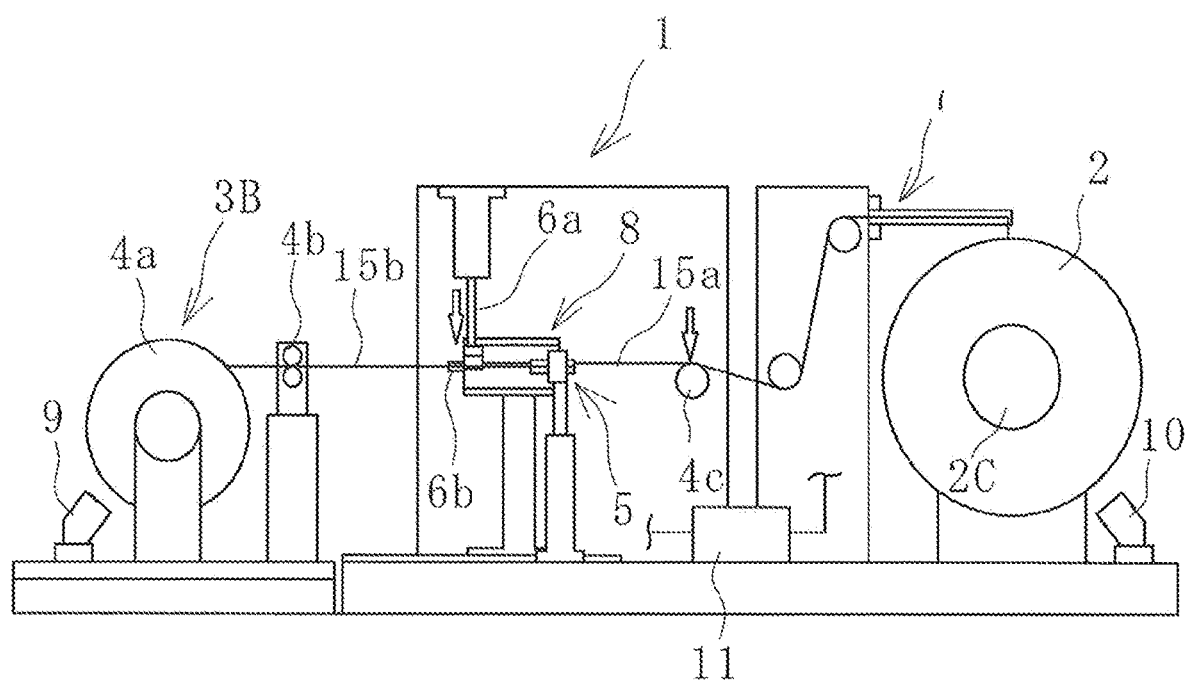
FIG. 16 is an explanatory diagram illustrating a step of moving the trailing edge portion holding machine in FIG. 15 toward the splice mechanism.

Then, as illustrated in FIG. 16, the trailing edge portion holding machine 6a and the holding roller 4c are moved downward. Accordingly, the preceding carcass cord 15a is inserted into the splice mechanism 8, and the trailing edge portion of the preceding carcass card 15a is placed in the splice mechanism 8.

Figure 17A:
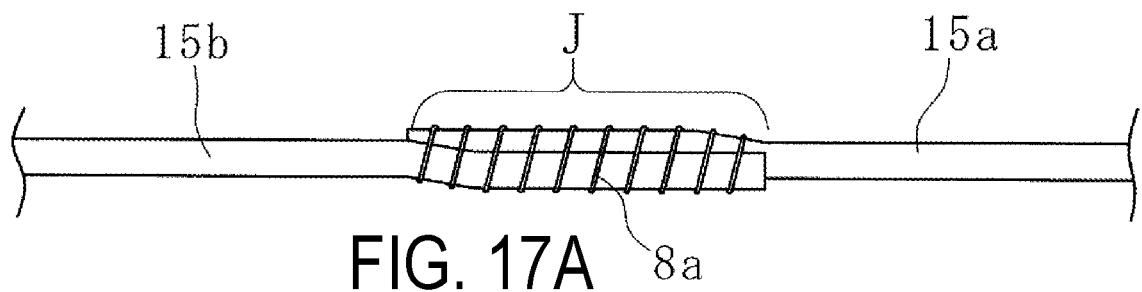
FIG. 17 is an explanatory diagram illustrating a joint portion at which the trailing edge portion of the preceding carcass cord is joined to the leading edge portion of the next carcass cord.
Figure 17B:
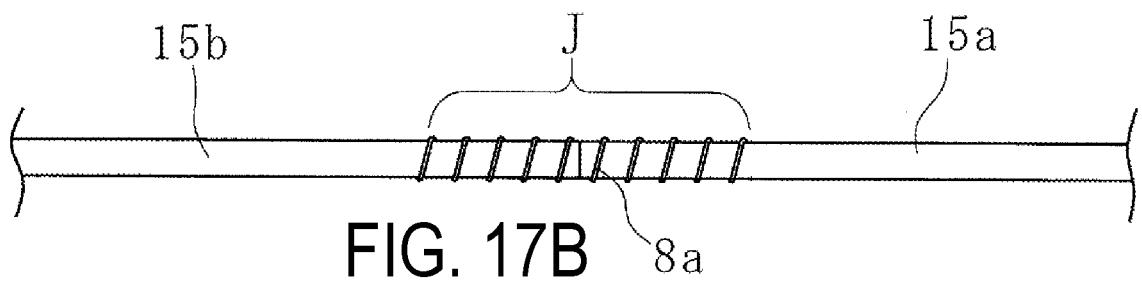

In the splice mechanism 8, the preceding carcass cord 15a and the next carcass cord 15b are joined and made continuous with each other using the splice mechanism 8 as illustrated in FIG. 17. At the joint portion J illustrated in FIGS. 17(A) and 17(B), a joining cord 8a is wound around outer circumferential surfaces of the preceding carcass cord 15a and the next carcass cord 15b to join the preceding carcass cord 15a and the next carcass cord 15b together.

In the manner of joining in FIG. 17(A), the carcass cords 15a and 15b overlap each other, and this is advantageous in improving bonding strength. In the manner of joining in FIG. 17(B), the carcass cords 15a and 15b are abutted against each other, and thus the joint portion J is less likely to be thicker than the non-joint portion. This is advantageous in reducing a difference in rigidity between the joint portion J and the non-joint portion. The manners of joining in FIGS. 17(A) and 17(B) can be used regardless of whether the carcass cords 15*a* and 15*b* are monofilament cords or twisted cords formed by intertwining a plurality of filaments.

Figure 17C:
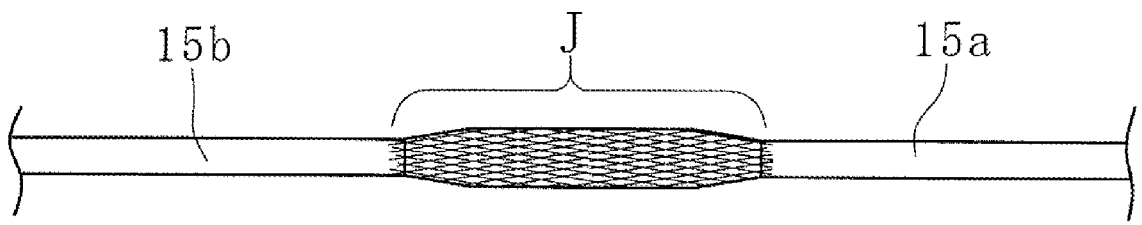

In a case where the carcass cords 15*a* and 15*b* are twisted cords formed by intertwining a plurality of filaments, the splicing method illustrated in FIG. 17(C) may also be used. At the joint portion J, the joining portions of the preceding carcass cords 15*a* and the next carcass cords 15*b* are untwisted by the injection pressure of a fluid such as air and then the untwisted portions are brought together and re-twisted to join the preceding carcass cords 15*a* and the next carcass cords 15*b*.

After the carcass cords 15*a* and 15*b* are joined and made continuous with each other, the holding of the carcass cord 15*b* by the conveying mechanism 5 and the holding of the carcass cord 15*a* by the trailing edge portion holding machine 6*a* are released. Then, the carcass cord 15*b* is fed from the feeding unit 3B toward the forming drum 2, and the forming drum 2 is rotated. Specifically, in a state similar to the state in FIG. 5, the next carcass cord 15*b* is fed toward the forming drum 2. Thus, with the next carcass cord 15*b* fed, the carcass layer is continuously formed and completed.

Figure 18:
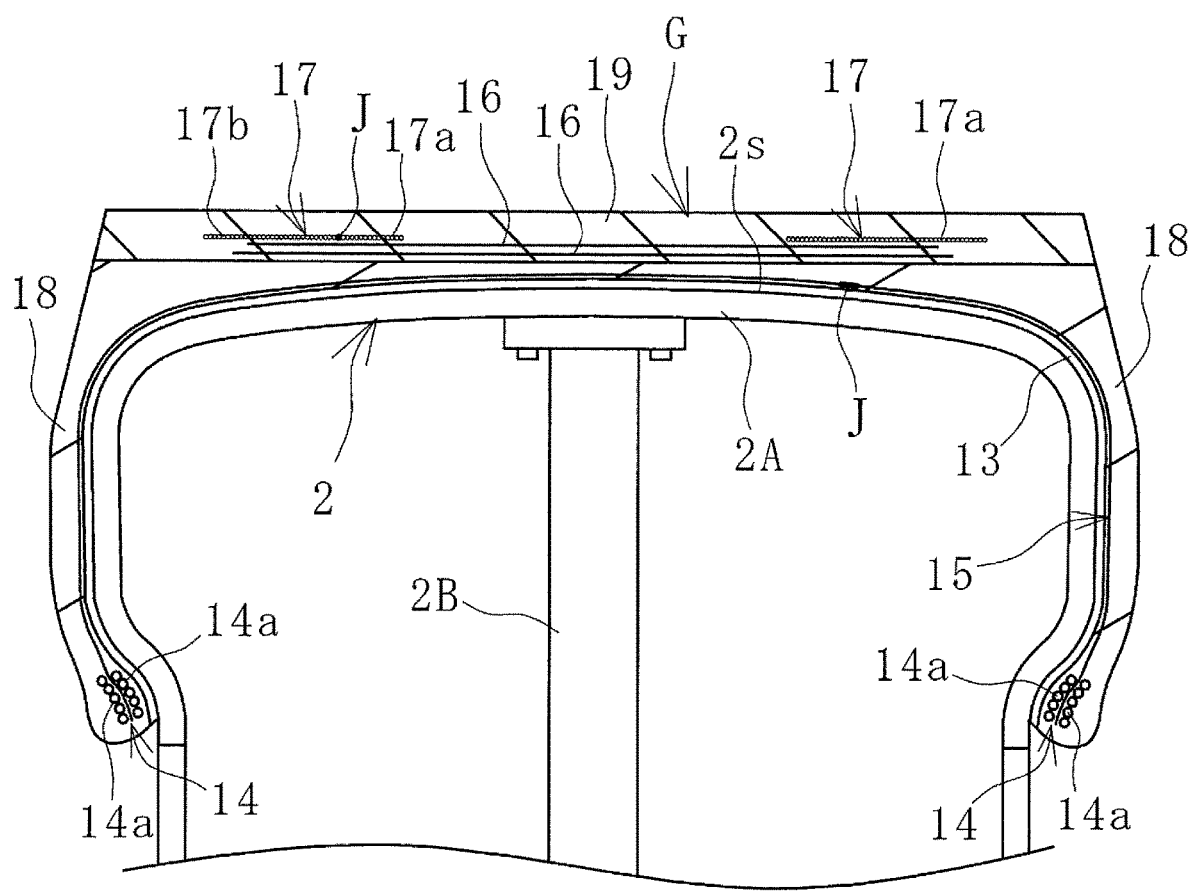
FIG. 18 is an explanatory diagram illustrating, in a cross-sectional view, a part of a green tire formed on the outer surface of the forming drum.

After the formation of the carcass layer 15, as illustrated in FIG. 18, the bead wires 14*a* are newly compression-bonded to and layered on an outer surface of the carcass cord 15*a* to sandwich the carcass cord 15*a* between the bead wires 14*a* at the respective width direction end portions of the outer surface 2*s* of the forming drum 2. Then, the side portion 18, the belt layer 16, the belt cover layer 17, and the tread portion 19 are layered to complete the green tire G.

In a case where the belt cover layer 17 is formed, the holding reel 4*a* in which the cover cords 17*a* and 17*b* are stocked is installed on the feeding unit 3 of the forming system 1. Like the above-described carcass cords 15*a* and 15*b*, the cover cords 17*a* and 17 are fed from the feeding units 3 (3A and 3 *b*) toward the forming drum 2. Then, with the forming drum 2 rotated around the center shaft 2C, the fed cover cords 17*a* and 17*b* are compression-bonded to an outer surface of the belt layer 6 while being moved by the arrangement unit 7 to one side in the width direction of the forming drum 2. The operation of the arrangement unit 7 forms the belt cover layer 17 including the one cover cord 17*a*, 17*b* continuously wound a plurality of times in the tire circumferential direction. The procedure in which, during the formation of the belt cover layer 17, the trailing edge portion of the preceding cover cord 17*a* is joined to the leading edge portion of the next cover cord 17*b* to make the cover cords 17*a* and 17*b* continuous with each other is similar to the corresponding procedure for the carcass cords 15*a* and 15*b*.

Figure 19:
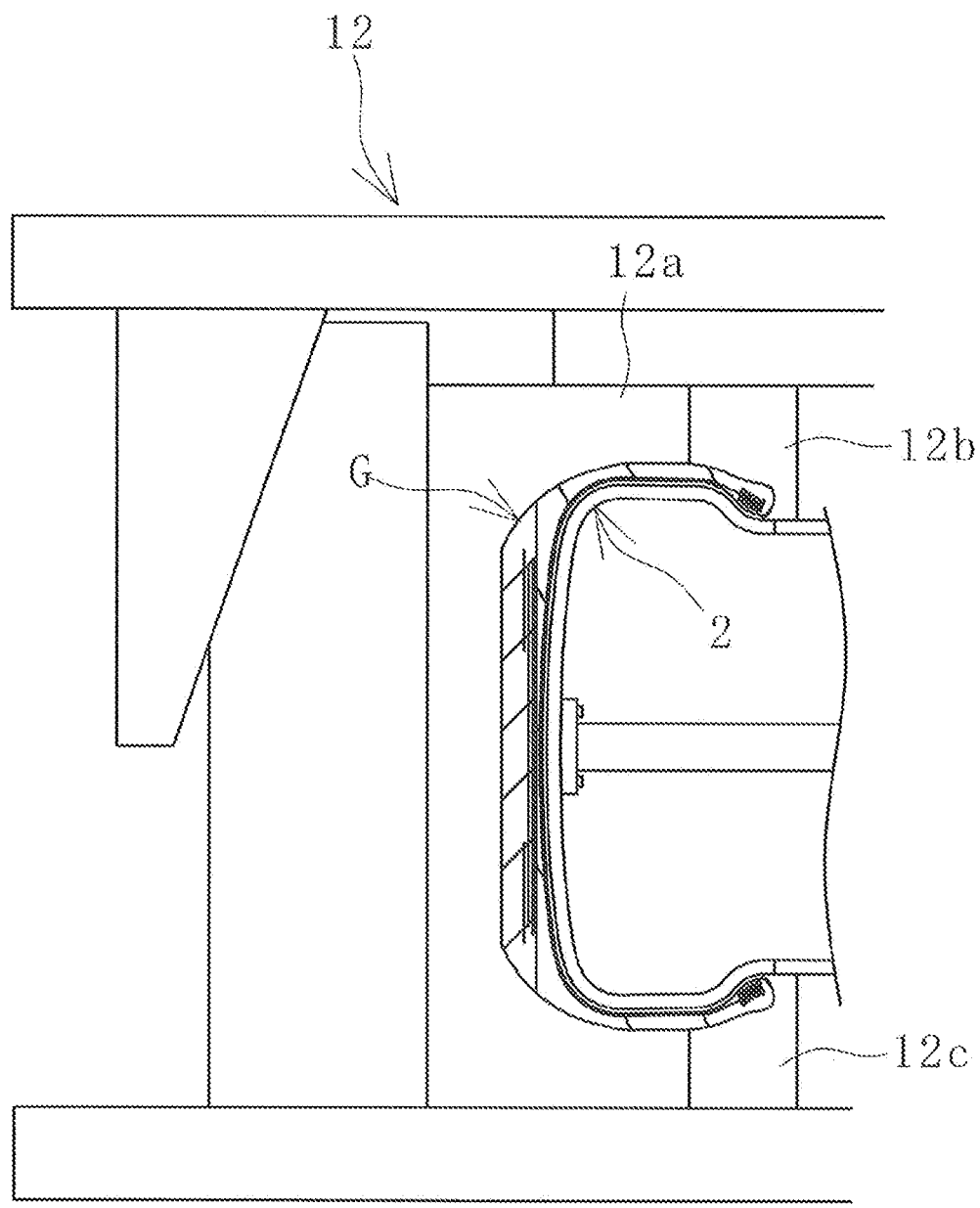
FIG. 19 is an explanatory diagram illustrating, in a cross-sectional view, a part of the green tire in FIG. 18 being vulcanized by a vulcanization device.

As illustrated in FIG. 19, the green tire G formed is installed, along with the rigid core 2, in vulcanization molds 12*a*, 12*b*, and 12*c* mounted on the vulcanization device 12, and is pressed at a predetermined pressure and heated at a predetermined temperature. By executing a vulcanization step of vulcanizing the green tire G for a predetermined amount of time as described above, the pneumatic tire T illustrated in FIGS. 1 to 3 is completed. After the vulcanization step, the rigid core 2 is disassembled and removed from the pneumatic tire T.

Thus, according to the forming system 1 and the method of manufacturing the tire, for formation of the desired reinforcing members 15 and 17, the preceding reinforcing cords 15*a* and 17*a* fed to the forming drum 2 in advance are joined to and made continuous with the next reinforcing cords 15*b* and 17*b*, thus continuing formation of the reinforcing members 15 and 17. Accordingly, even in a case where the remaining amounts of the reinforcing cords 15*a* and 17*a* stocked in the holding reel 4*a* are too small and insufficient to complete the reinforcing members 15 and 17, the reinforcing members 15*a* and 17*a* can be used for formation of the reinforcing members 15 and 17 without waste.

In addition, after feeding of a predetermined length of the preceding reinforcing cord 15*a* or 17*a*, the leading edge portion of the next reinforcing cord 15*b* or 17*b* paid out from the holding reel 4*a* in advance can be joined to and made continuous with the trailing edge portion of the preceding reinforcing cord 15*a* or 17*a* by the splice mechanism 8. Consequently, the time for which the steps are disrupted is reduced, thus allowing avoidance of a decrease in productivity of the tire.

In the present embodiment, in a case where the carcass layer 15 is formed, the progress sensor 10 detects the progress state of formation of the carcass layer 15 on the forming drum 2 using the preceding carcass cord 15*a*. Thus, based on the detected progress state of formation, the control unit 11 determines a longitudinal position on the preceding carcass cord 15*a* to which the leading edge portion of the next carcass cord 15*b* is joined. Control is performed such that the trailing edge portion of the preceding carcass cord 15*a* is joined to the leading edge portion of the next carcass cord 15*b* at the determined longitudinal position on the preceding carcass cord 15*a*. This control places the joint portion J at the desired position on the carcass layer 15 being formed.

A path from the position where the trailing edge portion of the preceding carcass cord 15*a* and the leading edge portion of the next carcass cord 15*b* are joined (the position of the splice mechanism 8) to the position where the carcass cord 15*a* is fed to the forming drum 2 has a known distance. Thus, performing the control described above allows placement of the position of the joint portion J within the tire width direction setting range of the belt layer 16 of the green tire G (tire T) or within the setting range of the bead core portion 14. Similar control can be performed on the cover cords 17*a* and 17 *b*.

The invention claimed is:

1. A method for manufacturing a tire comprising a reinforcing member comprising a reinforcing cord continuously wound a plurality of times in a tire circumferential direction or wound in the tire circumferential direction while continuously extending in a tire width direction, the method comprising:

preparing a plurality of feeding units feeding the reinforcing cords, feeding, in advance as a preceding reinforcing cord, the reinforcing cord stocked in one of the feeding units and using the preceding reinforcing cord to form the reinforcing member, using, as a next reinforcing cord, the reinforcing cord stocked in another of the feeding units and paying out a leading edge portion of the next reinforcing cord, at a time when a predetermined length of the preceding reinforcing cord is fed, joining the leading edge portion to the preceding reinforcing cord using a splice mechanism to make the leading edge portion continuous with the preceding reinforcing cord, then continuing formation of the reinforcing cord while feeding the next reinforcing cord to complete the reinforcing cord, and vulcanizing a green tire with the reinforcing member completed, detecting a progress state of formation of the reinforcing member using the preceding reinforcing cord, determining, based on the progress state of formation detected, a longitudinal position on the preceding reinforcing cord to which the leading edge portion is joined, and joining the preceding reinforcing cord to the next reinforcing cord at the longitudinal position determined to place, at a desired position on the reinforcing member, a joint portion at which the preceding reinforcing cord and the next reinforcing cord are joined;

wherein the desired position is at a position overlapping a bead core portion of the tire in a tire radial direction, and the formation of the reinforcing member continues without stopping the rotation of a forming drum to which the reinforcing cord is fed while joining the leading edge portion of the next reinforcing cord to the preceding reinforcing cord using the splice mechanism.

2. The method of manufacturing a tire according to claim 1, wherein formation of the reinforcing member is performed on an outer surface of a rigid core comprising an outer surface corresponding to an inner surface of the tire vulcanized and completed.

3. The method of manufacturing a tire according to claim 1, wherein a joining cord is wound around outer circumferential surfaces of the preceding reinforcing cord and the next reinforcing cord to join the preceding reinforcing cord and the next reinforcing cord to make the preceding reinforcing cord and the next reinforcing cord continuous with each other.

4. The method of manufacturing a tire according to claim 1, wherein joining portions of the preceding reinforcing cord and the next reinforcing cord are untwisted by injection pressure of a fluid, and then untwisted portions of the preceding reinforcing cord and the next reinforcing cord are brought together and re-twisted to join the preceding reinforcing cord and the next reinforcing cord to make the preceding reinforcing cord and the next reinforcing cord continuous with each other.

5. The method of manufacturing a tire according to claim 1, further comprising cutting the preceding reinforcing cord at the time when the predetermined length of the preceding reinforcing cord is fed, and joining the leading edge portion to the preceding reinforcing cord after the cutting, wherein formation of the reinforcing member is performed on an outer surface of a rigid core comprising an outer surface corresponding to an inner surface of the tire vulcanized and completed, and joining portions of the preceding reinforcing cord and the next reinforcing cord are untwisted by injection pressure of a fluid, and then untwisted portions of the preceding reinforcing cord and the next reinforcing cord are brought together and re-twisted to join the preceding reinforcing cord and the next reinforcing cord to make the preceding reinforcing cord and the next reinforcing cord continuous with each other.

* * * * *